United States Patent Office 3,558,231
Patented Jan. 26, 1971

---

3,558,231
MACHINE ZERO LOCATOR
Joseph F. Bakel, Lyndhurst, Va., assignor to General
Electric Company, a corporation of New York
Filed Oct. 3, 1967, Ser. No. 672,572
Int. Cl. G01b 11/26
U.S. Cl. 356—152                                10 Claims

ABSTRACT OF THE DISCLOSURE

A three-dimensional zero position locator utilizing a laser, mirrors and a quad-photodetector. Some of the mirrors are mounted on platforms movable relative to the laser source and the quad-photodetector. The platforms are moved until the laser beam reflected from the mirrors lies in the center of the face of the quad detector thereby establishing a fixed point which can always be relocated.

BACKGROUND OF THE INVENTION

In the machine tool art the tool and the workpiece are ordinarily movable relative to each other along orthogonal $x$, $y$ and $z$ coordinates. Certain machine tool operations require that the tool and workpiece be positioned relative to each other with an extremely high degree of accuracy prior to the initiation of the machine tool cycle. Furthermore upon the completion of a machine tool cycle it is necessary to be able to return the machine to the identical starting position for subsequent machine tool cycles.

It is not only necessary to be able to find a constant starting point for a machine tool operation which is automatically controlled but it is also necessary to provide the necessary adjustment for offset created by machine growth, such as that which may be due to temperature variations.

The purpose of the present machine zero locator is to find a reference point in space by locating reference positions along the $x$, $y$ and $z$ axes for the movable machine parts, thereby providing the capability of returning to the reference point at any time during the operation of the machine. By using the machine zero locator of the present invention it is always possible to set the platform in the identical position relative to the machine tool regardless of variations in the mechanical apparatus created by machine growth due to temperature variations.

The present invention by utilizing a system including a laser, mirrors and a quad-photodetector relies upon coherent light as a yardstick rather than micrometric gears, scribed grids or other mechanical references. The locator of the present invention is capable of sensing deviations in the order of 10 microinches per linear foot of beam under normal shop air conditions thereby providing a far greater degree of accuracy than previous mechanical or optical-mechanical position locating systems.

SUMMARY OF THE INVENTION

The present invention is directed to a machine tool locator comprising a machine bed including an upright column, first table means movably mounted on said bed for movement along a first axis, second table means movably mounted on said first table means for movement along a second axis transverse to said first axis, tool support means movably mounted on said column for movement along a third axis orthogonal to said first and second axes, laser beam source means mounted on said bed for directing a beam of light along said first axis, first mirror means mounted on said first table means for reflecting said beam of light along a path parallel to said second axis, second mirror means mounted on said tool support means for reflecting said beam of light along a path parallel to said first axis, third mirror means mounted on said second table means for reflecting said beam of light along said second axis to said second mirror means when said second table means is moved to bring said third mirror means into alignment with said laser source means and said first mirror means and said first table means is shifted at increment equal to the distance between said first and third mirror means along said first axis, photodetector means mounted on said tool support means for receiving said beam of light reflected from said second mirror means and producing signal means indicative of the position of said beam of light relative to a predetermined fixed point on said photodetector means and machine position control means responsive to said signal means for driving said work support means and said tool support means to a predetermined zero position.

Other features of the invention will be pointed out in the following description and claims and illustrated in the accompanying drawings, which disclose, by way of example, the principles of the invention and the best mode which has been contemplated of applying those principles.

In the drawings:

FIG. 4 is a schematic showing of the photodetector means.

DETAILED DESCRIPTION OF THE INVENTION

Figure 1:
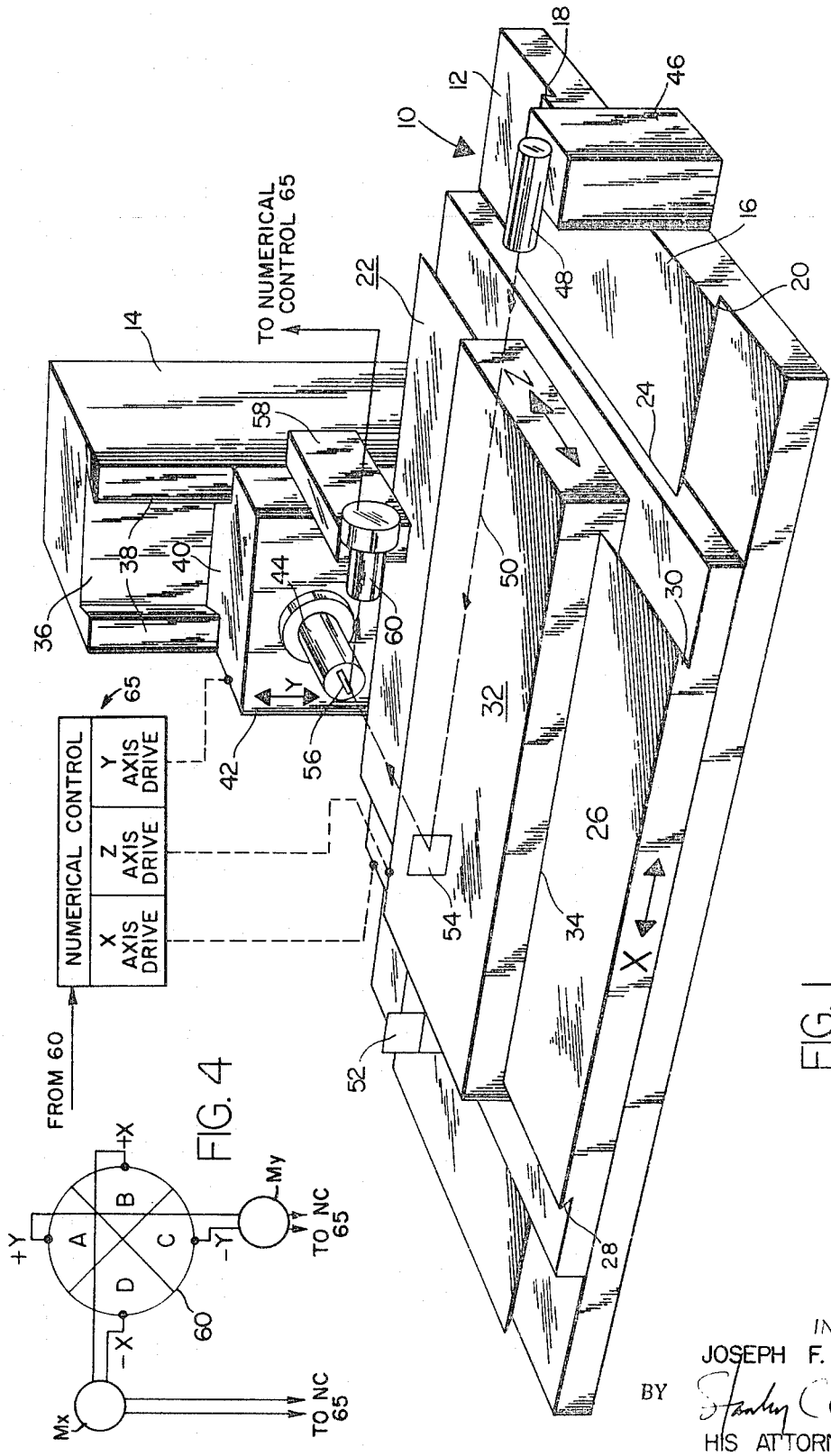
FIG. 1 is a perspective view of a machine having a machine zero locator mounted thereon showing the arrangement for positioning the tool support means and the second table means along the $y$ and $z$ axis respectively relative to said laser beam source.

In FIG. 1 the machine is generally designated at 10 and is comprised of a base or bed member 12 which is disposed in a generally horizontal plane. Secured to the bed 12 at one side thereof is a vertically extending column 14. The bed 12 is provided with a raised center portion 16 having inwardly converging bevelled side edges 18 and 20 defining a tongue member. A first work support table 22 is slidably mounted on the bed 12 and is provided with a groove 24 in the underside thereof having a configuration complementary to the tongue 16 on the bed. In this manner the first work support table is guided for movement longitudinally of the machine bed 12 on the axis $x$.

The upper surface of the first work support table 22 is provided with a raised portion 26 having inwardly converging bevelled side edges 28 and 30 defining a tongue member. A second work support table 32 is provided with a groove 34 in the lower surface thereof complementary in shape to the tongue member 26 to provide suitable guide means for the movement of the table 32 transverse to the able 22 along the z axis.

It is well known in the art that work support tables may be driven along perpendicular coordinates relative to a base member by any suitable drive means such as a rack and pinion, a screw and nut arrangement or the like. Since the specific drive means do not form a part of the present invention it is not deemed necessary to show the specific drive train for the table members 22 and 32. Also as is well known in the art the drive members may be controlled during normal operation by an automatic control system such as a numerical control system 65 which controls positioning of 22 through its $x$ axis drive, 32 through its z axis drive and 42 through its y axis drive.

The vertical column member 14 is provided with a groove 36 having bevelled side edges 38 for the reception of a complementary tongue member 40 formed on the side surface of the vertically movable tool support member 42. The specific tool member (not shown) may be mounted on any part of the vertically movable member including the spindle 44 protruding from the side of the tool support member 42. The specific drive arrangement for the tool support member 42 for moving the member 42 in a vertical direction along the y axis may be of any suitable form such as the drive arrangement mentioned above. Once again since the specific drive arrangement does not form a part of the present invention it is not deemed necessary to set forth the details of such a drive arrangement in the drawings.

A laser support member 46 is rigidly secured to the bed 12 and supports a laser source means 48 in a specific predetermined location relative to the three movable parts of the machine, namely the first table 22, the second table 32 and the tool support means 42. The laser source 48 is arranged so as to direct a beam of coherent light 50 in a direction longitudinally of the bed 12 along the x axis. The laser source 48 may be of any suitable type.

A first mirror 52 is mounted on the first work support table 22 and is provided with a reflecting surface disposed at an angle of 45 degrees relative to the x axis so that the mirror 52 wil deflect the laser beam 50 at right angles to the x axis along the z axis. A second mirror 54 similar to the mirror 52 is mounted on the surface of the second work support table 32 and is provided with a reflecting surface disposed at an angle 45 degrees relative to the x axis so as to deflect the laser beam 50 at right angles along the z axis. A third mirror 56 is mounted on the spindle 44 on the tool support carriage 42 and is disposed with its reflecting surface at an angle of 45 degrees with respect to the z axis so as to deflect the laser beam at right angles to the z axis in a direction opposite to and parallel to the original beam of light 50 emanating from the laser source 48.

A photodetector support 58 mounts a photodetector cell 60 in a rigid manner on the tool support carriage 42 in a position wherein the photosensitive surface of the photodetector means is disposed for reception of the beam of light reflected from the mirror 56. The photodetector device 60 is a quadphotodetector which has a photosensitive surface, as shown in FIG. 4, divided into four quadrants, A, B, C and D. Each of the quadrants is like a separate photodetector and if the light beam impinging upon the photodetector 60 is perfectly centered both the x and y outputs are zero. If the beam is off center an output signal, indicated by plus or minus voltages or currents, is produced which then may be utilized in a conventional manner to control positioning motors for the work support tables and the tool support carriage. Also, the x and y outputs, indicating respectively the horizontal and vertical offset of the beam from the dead-center position, are applied to separate meters which visually indicate the horizontal and vertical offset. The platforms are then moved by any convenient means until the meter offset readings are reduced to zero. A laser beam is used because of its symmetry and because of the fact that a laser beam does not diverge greatly with distance. Deviations in the order of 10 microinches per linear foot of beam can be sensed by the device under normal shop air conditions. Shrouding the beam brings this down to approximately two microinches per foot.

Although the mirror 56 is shown as mounted on the cylindrical casing 44 it is obvious that the mirror 56 could be mounted in any suitable location on the tool support carriage 42 as long as the beam of light which is reflected from the mirror 56 will impinge upon the photodetector device 60. In fact, if the photodetector device 60 were to be turned 90 degrees with its sensing element facing the machine bed there would be no need for the mirror 56 since the light beam 50 which is reflected from either the mirror 52 or the mirror 54 would then impinge directly upon the photodetector 60.

In determining the positions for the three movable elements along their axes of movement a two-step procedure is utilized. The position of the table 22 on the x axis and the position of the carriage 42 on the y axis may be determined simultaneously by means of the arrangement shown in FIG. 2. According to this method the table 32 is shifted to one side so that the mirror 54 will be out of the path of the laser beam 50. The table 22 and the carriage 42 are then moved along their respective axes of movement until the laser beam 50 is reflected from the mirror 52 to the mirror 56 and then to the photodetector at the exact center point of the four photosensing elements. If the laser beam strikes the direct center of the photodetector device 60 there will be no output currents or voltages to the drive motors for the table 22 and the carriage 42 and the positioning will be complete. However, if there is a deviation of the beam of light from the exact center of the photodetector device 60 an appropriate signal will be supplied to the drive means of either the table 22 or the carriage 42 to move one or both of them to the desired position.

Figure 2:
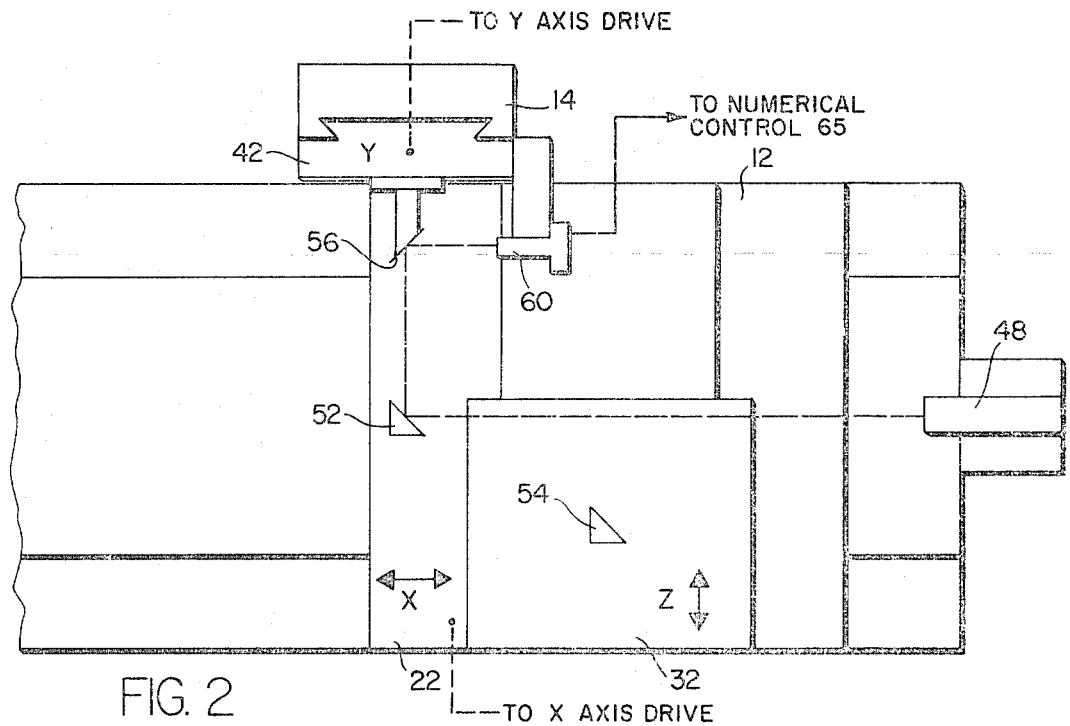
FIG. 2 is a top plan view of the machine shown in FIG. 1 showing the arrangement for determining the position of the first table means and the tool support means along the $x$ and $y$ axis respectively relative to said laser beam source.

Once the table 22 and the carriage 42 have been accurately positioned the table 22 may be shifted to the left as viewed in FIG. 2 a predetermined distance exactly equal to the distance between the mirrors 52 and 54. The table 32 is then moved along the z axis until the mirror 54 is positioned in such a manner as to deflect the laser beam 50 to the mirror 56 on the carriage 42 and then to the exact center point of the photodetector device 60. Any deviations in the position of the table 32 from the true position will be compensated for by the signal produced by the photodetector device and supplied to the servo drive for the table 32.

Figure 3:
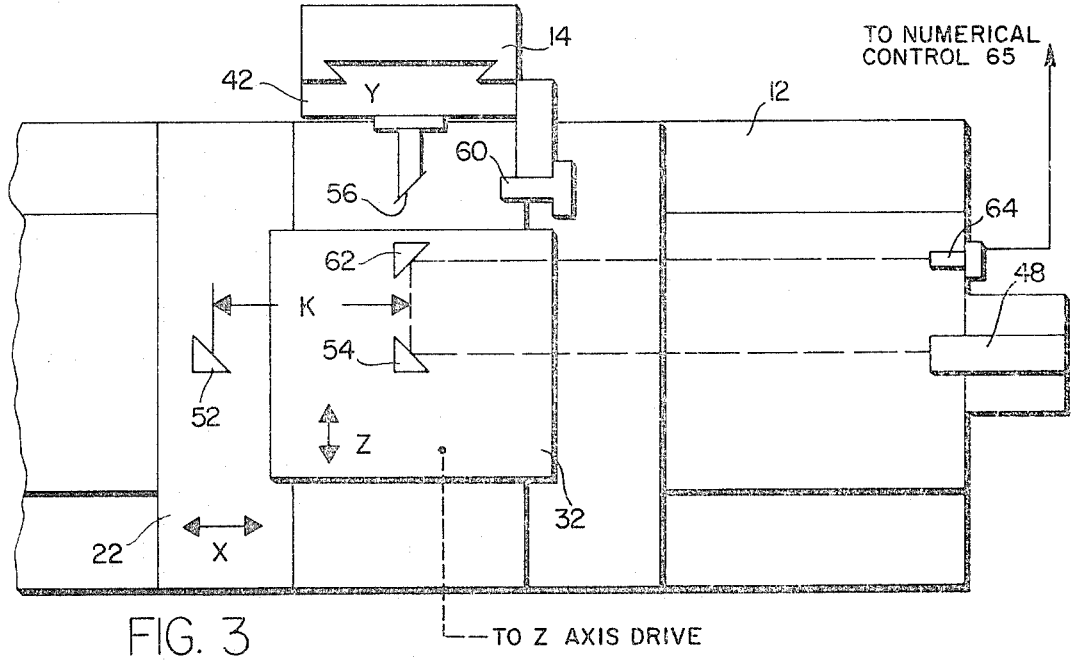
FIG. 3 is a top plan view similar to FIG. 2 showing a modified arrangement for determining the position of a second table means along the $z$ axis relative to said laser beam source.

In utilizing the arrangement of FIG. 1 for determining the exact location of the table 32 along the z axis the location will be a function of the x axis location of the table 32. Therefore, when an extremely accurate location of the table 32 is required along the z axis, the arrangement as shown in FIG. 3 may be utilized. In this modification a second mirror 62 is mounted on the surface of the table 32 so that the laser beam 50 will be reflected by the mirrors 54 and 62 along a path opposite to and parallel to the initial path of the light beam 50 as it leaves the laser source 48. A second photodetector 64 similar to the photodetector 60 may be mounted on the bed of the machine adjacent to the laser source 48 in a position to intercept the laser beam 50 as it is reflected from the mirror 62. Thus, by having the reflecting surfaces of the mirrors 54 and 62 disposed at right angles to each other the position of the table 32 may be varied along the x axis without affecting the output of the photodetector 64. However, if there is any unwanted deviations of the position of the table 32 along the z axis an output signal will be provided by the photodetector 64 which will control the servo positioning mechanism for the table 32 along the z axis.

As mentioned previously the laser is extremely suitable for the zero locator of the present invention due to its very small spread along the length of the laser beam. Also the laser beam is visible when interrupted by any surface thereby enabling the various movable elements to be jogged easily and quickly into acquisition range. By using the arrangement of the present invention no mechanical damage results if the motions are driven too far through the zero position and extreme accuracy is obtainable for reasonable size machines. The laser and the sensor are available on the machine to check the machine alignment at any time and the present system is completely free of the usual electromechanical sensor problems. As mentioned previously, the servo positioning mechanisms for each of the movable elements may be of any suitable conventional form.

Obviously, many modifications and variations of the present invention are possible in the light of the above teachings. For example, while the drawings generally show one mirror mounted on any one of the movable members, a plurality of mirrors could be used. Such a plurality may be necessary where the members do not move along axes that are orthogonal to each other, but which may be oblique. It is thus to be understood that as long as the machine members are moving relative to each other within the range of mirror reflected light and without substantial loss of resolution, the above-described principles of the invention are applicable. In this respect, it can be said that the members can move along axes that are substantially orthogonal. It should also be noted that the laser and photodetector can be interchanged to accomplish identical results. Also, the principles of the invention are applicable to rotating members as well as members which move along axes substantially orthogonal. It is, therefore, to be understood, that within the scope of the appended claims, the invention may be practiced otherwise than as specifically described.

What is claimed and desired to be secured by Letters Patent of the United States is:

1. A reference point locator for positioning relatively movable members at predetermined reference positions with respect to a fixed point located on a base, comprising a first member movably mounted to move along a first axis on said base, a laser beam source means mounted at said fixed point for directing a beam of light at said first member a second member movable relative to said first member along a second axis substantially orthogonal to said first axis, photodetecting means mounted on said second member for indicating the position of an impinging light beam which is directed along said first axis, light reflecting means mounted on said first member for causing said beam of light to be reflected to said photodetecting means when said first member and said second member are at said predetermined reference positions, said photodetecting means responsive to the position of said light beam with respect to the center of its face to produce respective error signals proportional to the first axis and second axis off-center positions of said light beam respectively, and first axis and second axis drive means responsive to respective ones of said first axis and second axis error signals to drive the first and second members in directions to reduce the off-center positions of said light beam to zero.

2. A reference point locator for positioning relatively movable members at predetermined reference positions with respect to a fixed point located on a base, comprising a first member movably mounted to move along a first axis on said base, photodetecting means mounted at said fixed point for indicating the position of an impinging light beam, a second member movable relative to said first member along a second axis substantially orthogonal to said first axis, laser beam source means mounted on said second member for directing a beam of light at said first member, light reflecting means mounted on said first member for causing said beam of light to be reflected to said photodetecting means when said first member and said second member are at said predetermined reference positions, said photodetecting means producing respective error signals proportional to the first axis and second axis off-center positions of said light beam with respect to a center position of said light beam, and first axis and second axis servo means responsive to respective ones of said error signals to drive said first and second movable members in directions to reduce the off-center positions of said light beam to zero.

3. A reference point locator for positioning relatively movable members at predetermined reference positions with respect to a fixed point located on a base, comprising a first member movable along a first axis on said base, a laser light beam source mounted at said fixed point for directing a beam of light at said first member, a second member movable along a second axis substantially orthogonal to said first axis, photodetecting means mounted on said second member for indicating the position of an impinging light beam which is directed along said first axis, light reflecting means mounted on said first member for causing said beam of light to be reflected to said photodetecting means when said first member and said second member are at said predetermined reference positions, and a third member movably mounted for movement with respect to said first and second axes, light reflecting means mounted on said third member at a position to reflect said light beam into said photodetecting means when said third member and said second member are at predetermined reference positions, said photodetecting means responsive to the position of said light beam with respect to the center of its face to produce error signals proportional to the respective axis off-center positions of said light beam, and drive means responsive to said error signals to drive said members in directions to reduce the off-center positions of said light beam to zero.

4. A reference point locator as claimed in claim 3 wherein said third member is mounted on said first member and moves along a third axis substantially orthogonal to said first and second axes.

5. A reference point locator as claimed in claim 3 wherein said photodetecting means is a quad-photodetector having four light sensitive segments forming a light sensitive face for indicating the position of said light beam with respect to the center of said face.

6. A reference point locator as claimed in claim 5 further comprising light reflective means mounted on said second member in a position for reflecting said light beam reflected by the light reflective means mounted on said first member toward said light sensitive face, said photodetecting means being positioned with its light sensitive face facing in a direction to receive said light beam reflected from the second member mounted light reflective means.

7. A reference point locator for positioning relatively movable members at predetermined reference positions with respect to a fixed point located on a base, comprising a first member movably mounted to move along a first axis on said base, a laser light beam source means mounted at said fixed point for directing a beam of light at said first member, a second member movable relative to said first member along a second axis substantially orthogonal to said first axis, first photodetecting means mounted on said second member for indicating the position of an impinging light beam which is directed along said first axis, light reflecting means mounted on said first member for causing said beam of light to be reflected to said first photodetecting means when said first member and said second member are at said predetermined reference positions, a third member movably mounted for movement with respect to said first and second axes, second photodetecting means for indicating the position of an impinging light beam, said second photodetecting means being mounted at a fixed point facing toward said third member, light reflective means mounted on said third member for reflecting said beam of light from said laser source into said second photodetecting means when said third member is at said reference position, said photodetecting means responsive to the position of said light beam with respect to the center of its face to produce error signals proportional to the respective axis off-center positions of said light beam, and drive means responsive to said error signals to drive said members in directions to reduce the off-center positions of said light beam to zero.

8. A reference point locator as claimed in claim 7 wherein said third member is mounted on said first member and moves along a third axis substantially orthogonal to said first and second axes.

9. A reference point locator as claimed in claim 8 wherein each said photodetecting means is a quad-photodetector having four light sensitive segments forming a light sensitive face for indicating the position of said light beam with respect to the center of said face.

10. A reference point locator as claimed in claim 9 further comprising light reflective means mounted on said second member in a position for reflecting said light beam reflected by the light reflective means mounted on said first member toward said light sensitive face of the photodetecting means mounted on said second member, said latter photodetecting means being positioned with its light sensitive face facing in a direction to receive said light beam reflected from the second member mounted light reflective means.

References Cited

UNITED STATES PATENTS 2,692,527  10/1954  Wetzel _____ 356—152
2,703,505  3/1955  Senn _____ 356—172

RICHARD A. FARLEY, Primary Examiner

J. G. BAXTER, Assistant Examiner

U.S. Cl. X.R.

356—172